(12) United States Patent
Koinov

(10) Patent No.: US 7,945,474 B1
(45) Date of Patent: May 17, 2011

(54) UNIFIED AUTOMATED BILLING

(75) Inventor: Anton Koinov, Santa Clara, CA (US)

(73) Assignee: Google Inc., Mountain View, CA (US)

( * ) Notice: Subject to any disclaimer, the term of this patent is extended or adjusted under 35 U.S.C. 154(b) by 534 days.

(21) Appl. No.: 12/041,456

(22) Filed: Mar. 3, 2008

Related U.S. Application Data

(60) Provisional application No. 60/981,447, filed on Oct. 19, 2007.

(51) Int. Cl.
*G06Q 30/00* (2006.01)
(52) U.S. Cl. .................................................. 705/14.4
(58) Field of Classification Search .................. 705/14
See application file for complete search history.

(56) References Cited

U.S. PATENT DOCUMENTS

| | | | |
|---|---|---|---|
| 5,724,521 A | 3/1998 | Dedrick | |
| 5,948,061 A | 9/1999 | Merriman et al. | |
| 6,167,382 A | 12/2000 | Sparks et al. | |
| 6,401,075 B1 | 6/2002 | Mason et al. | |
| 6,985,882 B1 | 1/2006 | Del Soto | |
| 2004/0194131 A1* | 9/2004 | Ellis et al. | 725/34 |
| 2008/0147809 A1* | 6/2008 | Byers et al. | 709/206 |

FOREIGN PATENT DOCUMENTS

WO  WO 97/21183  6/1997

OTHER PUBLICATIONS

Zeff, R. and Aronson, B., *"Advertising on the Internet,"* second edition, pp. 1-436 (1999).

Langheinrich, M., et al., "Unintrusive Customization Techniques for Web Advertising" NEC Corporation, C&C Media Research Laboratories. Japan [Online], [retrieved on Apr. 1, 2008]. Retrieved from the Internet <URL:http://web.archive.org/web/20000819020800/www.ccrl.com/adwiz/adwiz-www8.html>.

Adknowledge Primary Services, Customer Reference Guide. pp. 1-90, 2000.

Accipiter, Inc., "Accipiter announces Accipiter AdManager, a breakthrough in Internet advertising and marketing" [Online], [retrieved on Apr. 1, 2008]. Retrieved from the Internet <URL:http://web.archive.org/web/19980201092220/www.accipiter.com/press/releases/pr_adman10.htm> Sep. 9, 1996.

(Continued)

*Primary Examiner* — Thomas M Hammond, III
(74) *Attorney, Agent, or Firm* — Fish & Richardson P.C.

(57) ABSTRACT

Various aspects can be implemented for providing a unified automated billing system for offline media (e.g., radio, television, newspaper, and the like) advertising that spans across different time zones based on the concept of a station local time (e.g., the local time where the broadcast station is located) for the broadcast advertising spots. In general, one aspect can be a method that includes recording a local time for an allocated advertising spot when the ad played during the allocated advertising spot, such that the allocated advertising spot is in a broadcast time zone different from a billing time zone of the advertiser. The method also includes generating a station local time for the allocated advertising spot. The method further includes generating a billing event based on the station local time. Other implementations of this aspect include corresponding systems, apparatus, and computer program products.

12 Claims, 4 Drawing Sheets

OTHER PUBLICATIONS

Engage Technologies, Accipiter, "Questions and Answers about using Accipiter AdManager with Engage Precision Profiles" [Online], [retrieved on Apr. 1, 2008]. Retrieved from the Internet <URL:http://web.archive.org/web/19990209022600/www.accipiter.com/products/admanager/adm_profilesfaq.htm> Feb. 9, 1999.

Engage Technologies, Accipiter, "AdManager Frequently Asked Questions." [Online], [retrieved Apr. 1, 2008]. Retrieved from the Internet <URL:http://web.archive.org/web/19990208222457/www.accipiter.com/products/admanager/adm_faq.htm> Feb. 8, 1999.

Aaddzz Brokers Web Ad Space Sales Between Advertisers & Publishers, "The Best Way to Buy and Sell Web Advertising Space," 1997. [online] Retrieved from the Internet: <URL:http://www.aaddzz.com>.

Adforce, User Guide Version 2.6, "A Complete Guide to AdForce," 1998.

AdKnowledge Corporate Information, Company Overview, [online retrieved Aug. 16, 2007] Retrieved from <URL:http://web.archive.org/web/19990128143110/www.adknowledge.com/corporate/index.html>.

Adknowledge Customers, i-traffic, [Online], [retrieved Aug. 16, 2007] Retrieved from the Internet: <URLhttp://web.archive.org/web/19990503093107/www.adknowledge.com/aksystem/profile_itraffic.html>.

ADWIZ by NEC, "The Artificial Intelligence Solution for Advertisement Targeting," [Online], [retrieved Apr. 1, 2008] Retrieved from the Internet: <URL:http://web.archive.org/web/20000816042946/http://www.ccrl.com/adwiz/>.

AdKnowledge, Inc., Campaign Manager, "Streamlines buying and trafficking while saving time and money," [Online], [retrieved Aug. 16, 2007] Retrieved from the internet: <URL:http://web.archive.org/web/19990221080152/www.adknowledge.com/aksystem/campaign.html>.

NEC Corporation, "ADWIZ Intelligent Advertisement Targeting,".

Information Access Technologies, Inc., Aaddzz Highlights: The Maximum Performance Ad Network, "Aaddzz brokers Web ad space between advertisers & publishers," 1997 [Online], [retrieved Apr. 15, 2008] Retrieved from the Internet: <URL:http://web.archive.org/web/19980130092746/www.aaddzz.com/pages/b-highlights>.

Information Access Technologies, Inc., "Introduction to Aaddzz," [Online], [retrieved Apr. 15, 2008] Retrieved from the Internet: <URL:http://web.archive.org/web/19980130092752/www.aaddzz.com/pages/b-intro>.

Information Access Technologies, Inc., "Aaddzz Publishers," [Online], [retrieved Apr. 15, 2008] Retrieved from the Internet: <URL:http://web.archive.org/web/19980130092758/www.aaddzz.com/pages/b-publish>.

Information Access Technologies, Inc., "Aaddzz Advertisers," [Online], [retrieved Apr. 15, 2008] Retrieved from the Internet: <URL:http://web.archive.org/web/19980130092804/www.aaddzz.com/pages/b-advertise>.

Information Access Technologies, Inc., Aaddzz Ads, Spaces, & Places [Online], [retrieved Apr. 14, 2008] Retrieved from the Internet: <URL:http://web.archive.org/web/19980130092810/www.aaddzz.com/pages/b-adspacesplaces>.

Information Access Technologies, Inc., "Aaddzz Real-Time Reporting & Statements," [Online], [retrieved Apr. 15, 2008] Retrieved from the Internet: <URL:http://web.archive.org/web/19980130092816/www.aaddzz.com/pages/b-realtime>.

Information Access Technologies, Inc., "Aaddzz Buying Ad Space with Aaddzz," [Online], [retrieved Apr. 15, 2008] Retrieved from the Internet: <URL:http://web.archive.org/web/19980130092822/www.aaddzz.com/pages/advertising>.

Information Access Technologies, Inc., "Aaddzz Selling Ad Space With Aaddzz," [Online], [retrieved Apr. 15, 2008] Retrieved from the Internet: <URL:http://web.archive.org/web/19980130092829/www.aaddzz.com/pages/selling>.

Information Access Technologies, Inc., "Aaddzz Fees and Payments," [Online], [retrieved Apr. 15, 2008] Retrieved from the Internet: <URL:http://web.archive.org/web/19980130092836/www.aaddzz.com/pages/pricing>.

Information Access Technologies, Inc., "Aaddzz Ratings," [Online], [retrieved Apr. 15, 2008] Retrieved from the Internet: <URL:http://web.archive.org/web/19980130092842/www.aaddzz.com/pages/ratings>.

Information Access Technologies, Inc., "Aaddzz Ad Sizes," [Online], [retrieved Apr. 15, 2008] Retrieved from the Internet: <URL:http://web.archive.org/web/19980130092848/www.aaddzz.com/pages/sizes>.

Information Access Technologies, Inc., "Aaddzz Free Access Reports," [Online], [retrieved Apr. 15, 2008] Retrieved from the Internet: <URL:http://web.archive.org/web/19980130092902/www.aaddzz.com/pages/reports>.

Information Access Technologies, Inc., "Aaddzz Advanced Topics," [Online], [retrieved Apr. 15, 2008] Retrieved from the Internet: <URL:http://web.archive.org/web/19980130092908/www.aaddzz.com/pages/advanced>.

Information Access Technologies, Inc., "Aaddzz Frequently Asked Questions," [Online], [retrieved Apr. 15, 2008] Retrieved from the Internet: <URL:http://web.archive.org/web/19980130092914/www.aaddzz.com/pages/faq>.

Information Access Technologies, Inc., "Aaddzz Home Page," [Online], [retrieved Apr. 15, 2008] Retrieved from the Internet: <URL:http://www.aaddzz.com/letter.html>.

NEC Corporation, NEC: Press Release "NEC announces ADWIZ, an Artificial Intelligence Solution for Advertisement Targeting Software on the World Wide Web," Jan. 8, 1999.

AdKnowledge Inc., "Comprehensive Planning," [Online], [retrieved on Aug. 16, 2007] Retrieved from the Internet: <URL:http://web.archive.org/web/19990221144457/www.adknowledge.com/aksystem/planner.html >.

AdKnowledge Inc., "Automates the targeting and serving of web advertising campaigns," [Online], [retrieved on Aug. 16, 2007] Retrieved from the Internet: <URL:http://web.archive.org/web/19990222023416/www.adknowledge.com/aksystem/smartbanner.html>.

IEEE Intelligent Systems, New Products, "Tell your computer where to go," United Kingdom, Jan./Feb. 1998.

AdKnowledge Inc., "The AdKnowledge System," [Online], [retrieved on Aug. 16, 2007] Retrieved from the Internet: <URL:http://web.archive.org/web/19990221115917/www.adknowledge.com/aksystem/index.html>.

AdKnowledge Inc., Corporate Information "AdKnowledge Events," [Online], [retrieved on Aug. 16, 2007] Retrieved from the Internet: <URL:http://web.archive.org/web/20000511005235/www.adknowledge.com/whatsnew/events.html>.

NEC Corporation, ADWIZ White Paper, "Taking Online Ad Targeting to the Next Level," [Online], [retrieved on Apr. 15, 2008] Retrieved from the Internet: <URL:http://web.archive.org/web/20010619222015/www.ccrl.com/adwiz/whitepaper.html>.

ScanScout, "ScanScout in the News," [Online], [retrieved Apr. 16, 2008]. Retrieved from the Internet: <URL:http://scanscout.com>.

Blinkx, "Video Search Engine—Blinkx," [Online], [retrieved Apr. 16, 2008]. Retrieved from the Internet: <URL:http://blinkx.com/>.

EveryZing, Inc., "Video SEO and Multimedia Search Solutions," [Online], [retrieved Apr. 16, 2008], Retrieved from the Internet: <URL:http://everyzing.com/>.

Inside Online Video, "Blinkx to Contextualize Video Ads Through Speech Recognition," Jun. 22, 2007 [Online], [retrieved Apr. 16, 2008] Retrieved from the Internet: <URL:http://www.insideonlinevideo.com/20007/06/22/blinkx-to-contextualize-video-ads-through-speech-recognition>.

* cited by examiner

UNIFIED AUTOMATED BILLING

PRIOR APPLICATIONS

This application claims priority to U.S. Provisional Application Ser. No. 60/981,447 entitled "Unified Automated Billing," filed on Oct. 19, 2007. The disclosure of the prior application is considered part of the disclosure of this application and is incorporated by reference in its entirety.

TECHNICAL FIELD

This disclosure generally relates to unified automated billing for offline advertising (e.g., television, radio, newspaper advertising, and the like) spots that spans across different time zones.

BACKGROUND

Advertisements can be included in various forms of broadcast media. For example, offline advertisements such as radio can be a powerful broadcast medium for advertisers to achieve their goals for a given advertising campaign. Additionally, radio advertising can increase online brand awareness, and be a cost effective way to reach a targeted audience. For example, an advertiser can target consumers with a specific lifestyle and demographics by selecting the station types, locations, and dayparts. Advertisers can book advertising campaigns with multiple broadcasters through an ad intermediary. Advertisers can specify criteria that the intermediary can use to book advertising spots for the advertising campaigns.

SUMMARY

This specification describes various aspects relating to providing a unified automated billing system for offline media (e.g., radio, television, newspaper, and the like) advertising that spans across different time zones based on the concept of a station local time (e.g., the local time where the broadcast station is located) for the broadcast advertising spots. For example, a radio advertising campaign can have advertising spots scheduled to be played in different markets that span many different time zones, which can create challenges when billing for the advertising spots. When determining the charges to the advertisers and payments to the broadcasters for a billing month, the automated billing system disclosed herein can account for the time zones where the advertising spots are broadcast or played.

In general, one aspect can be a method that includes recording a local time for an allocated advertising spot when the ad played during the allocated advertising spot, such that the allocated advertising spot is in a broadcast time zone different from a billing time zone of the advertiser. The method also includes generating a station local time for the allocated advertising spot. The method further includes generating a billing event based on the station local time. Other implementations of this aspect include corresponding systems, apparatus, and computer program products.

Another general aspect can be a system that includes a billing module configured to generating billing information for an advertising campaign. The system also includes means for generating a station local time for an allocated advertising spot, such that the allocated advertising spot is in a broadcast time zone different from a billing time zone of the advertiser. The system further includes means for generating a billing event, based in part, on the station local time.

These and other general aspects can optionally include one or more of the following specific aspects. For example, the system can include an advertiser-facing module configured to interface with an advertiser and to obtain campaign criteria for the advertising campaign. The system can also include an ad booking module configured to allocate the advertising spot based on the campaign criteria. The system can further include a broadcaster-facing module configured to interface with a broadcaster that broadcasts an ad.

In addition, the method can include obtaining an ad for an advertising campaign, and receiving campaign criteria for the advertising campaign. The method can also include allocating an advertising spot based on the campaign criteria, and monitoring the allocated advertising spot. The method can further include obtaining available advertising spots from broadcasters that meet the campaign criteria.

The local time for the allocated advertising spot can in the broadcast time zone. The step of generating the station local time can include removing the time zone information from the recorded local time. The step of generating the billing event can include generating billing information and payment or credit terms. The advertising campaign can be based on offline media that includes radio advertising, television advertising, or newspaper advertising.

Particular aspects can be implemented to realize one or more of the following potential advantages. The automated billing system disclosed herein can better align charges for the advertising spots with an advertiser's campaign. For example, when an advertiser budgets an advertising campaign for a given month, the advertiser can be billed based on the advertising spots played during the projected campaign month. Additionally, a nationwide campaign that spans across different time zones can easily be accommodated and the advertiser's objectives can be better fulfilled.

The general and specific aspects can be implemented using a system, method, or a computer program, or any combination of systems, methods, and computer programs. The details of one or more implementations are set forth in the accompanying drawings and the description below. Other features, aspects, and advantages will be apparent from the description, the drawings, and the claims.

DESCRIPTION OF DRAWINGS

These and other aspects will now be described in detail with reference to the following drawings.

Like reference symbols in the various drawings indicate like elements.

DETAILED DESCRIPTION

The systems and techniques described here relate to providing unified automated billing for offline media advertising (e.g., radio, television, newspaper advertising, and the like) that spans across different time zones based on the concept of a station local time (e.g., the local time where the broadcast station is located) for the broadcast advertising spots. The station local time can be used to determine whether to bill the advertiser for the advertising campaign in a given month.

As an example, suppose that an advertiser has chosen to run its advertising campaign during the month of January from January 1 to January 31 and has selected the 7 p.m.-to-midnight daypart to play its advertising spots. In addition, the advertiser's local time zone is Eastern Standard time zone, and the advertiser has selected a national campaign that covers different markets across the nation with different time zones. In such case, when an advertising spot is played on January 31 at 11 p.m. in the Pacific time zone, which is 2 a.m. on February 1 in the Eastern time zone, the unified automated billing system and techniques disclosed herein can determine whether to bill the advertising spot for the month of January or February.

In another example, suppose that an advertiser has chosen to run its national advertising campaign during the month of May from May 1 to May 31 and has selected the midnight-to-6 a.m. daypart to play its advertising spots. In addition, the advertiser's local time zone is Pacific time zone and the first advertising spot is scheduled to be played at midnight on May 1. In such case, when an advertising spot is played on May 1 at 12 a.m. in the Central time zone, which is 10 p.m. on April 30 in the Pacific time zone, the unified automated billing system and techniques disclosed herein can determine whether to bill the advertising spot for the month of April or May.

In the examples described in this disclosure, the system and techniques relate to providing unified automated billing for radio advertising campaigns. As noted above, however, the unified automated billing system and techniques described herein can also be applicable to other offline media advertising, such as newspaper advertising, television advertising, and the like.

Figure 1:
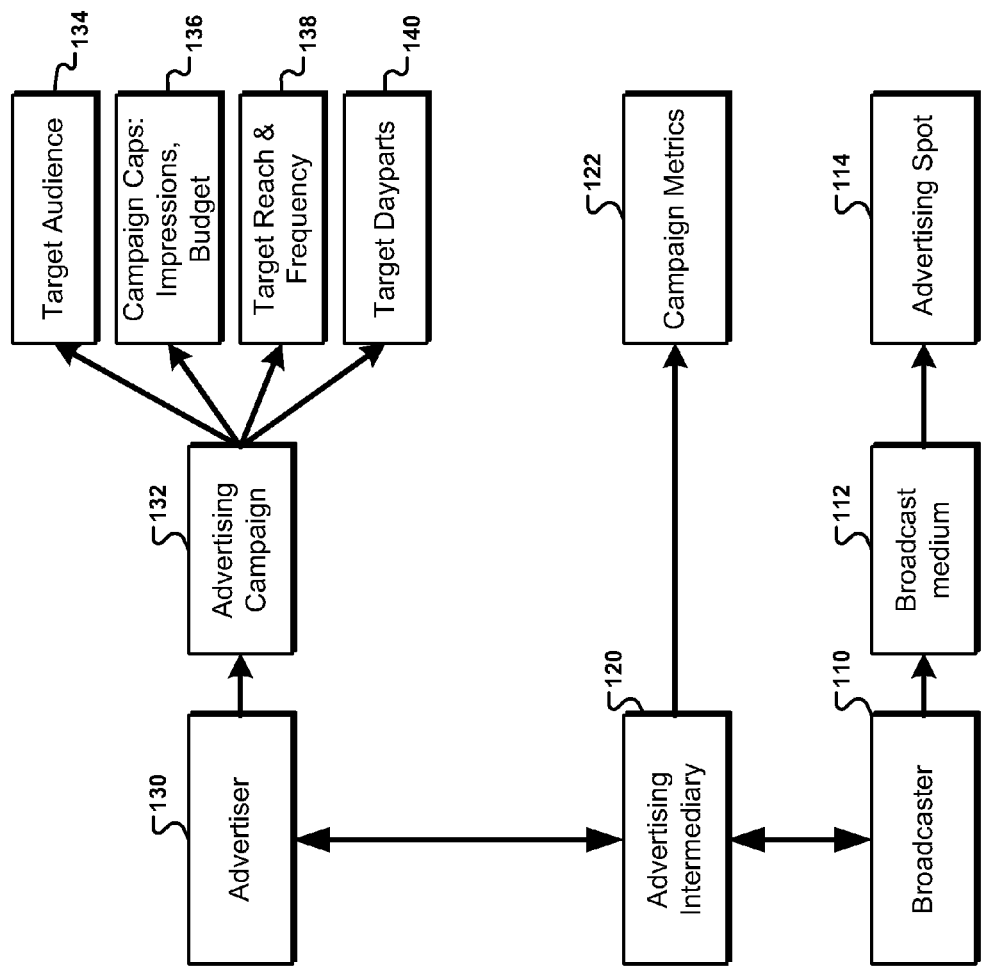
FIG. 1 shows relationships between various advertising components.

FIG. 1 shows relationships between various ad components. The diagram shows a broadcaster 110, which can include, e.g., a terrestrial radio station, a satellite radio station, a television station, a podcaster, a cellular broadcaster, or an Internet broadcaster. The broadcaster 110 can deliver broadcast content to the audience via broadcast medium 112, which can include, e.g., radio, television, or the Internet, or any digital broadcast medium. Additionally, various advertising spots, such as advertising spot 114, can be included as part of the broadcast content. The advertising spots are time slots when ads can play during a broadcast. For example, advertising spot 114 can be a 30-second time slot of the broadcast content.

The conceptual diagram of FIG. 1 also shows an advertising intermediary 120, which can include, e.g., Google Adwords for Audio. The advertising intermediary 120 can interface with and communicatively couple to the broadcaster 110 to manage available advertising spots for advertising campaigns. For example, the advertising intermediary 120 can provide a price rate (i.e., spot price or rate card price) associated with advertising spot 114. The rate card price can be a function of the number of estimated audience, which can vary based on the type of broadcaster, broadcasting market (e.g., Los Angeles vs. San Diego), and broadcasting daypart (e.g., morning commute vs. evening commute). Additionally, the advertising intermediary 120 can provide payment to the broadcaster 110 for playing the advertising spot 114.

For example, in radio advertising a commonly used measure of estimated listeners is a metric called average quarter hour (AQH) persons. The gross AQH can be defined as the average number of persons (ages 12 and above) listening to a broadcast for at least five minutes of a given 15-minute period. This information on gross AQH can be provided by third-party ratings companies, such as Arbitron.

Various campaign metrics 122 can be calculated by the advertising intermediary 120. Campaign metrics 122 can include, for example, a campaign reach and frequency, a spot efficiency, and a cost per mille (CPM) metric, or cost per thousand impressions. An impression can be defined as when an ad is played (e.g., audibly or visually) so that an audience can experience or perceive (e.g., hear or see) the ad. For example, given the rate card price and a gross AQH number for the spot, a gross CPM can be calculated as: gross CPM=(rate card price/gross AQH)*1000.

Reach and frequency are campaign metrics that can be used to measure the effectiveness of an advertising campaign. In radio advertising for example, "reach" estimates the number of unique listeners who hear the ad at least once during a given schedule; and "frequency" can estimate the average number of times each listener hears the ad during a given time period. The product of reach and frequency is approximately equal to the number of impressions; i.e., impressions~reach*frequency. Additionally, a gross reach per advertising spot can be associated with the gross AQH, which is described above. Since an advertising spot has a frequency of 1 (because it is presumed that the ad can be played once per advertising spot), for an advertising spot, gross reach can approximately equal gross AQH or impressions.

For a successful advertising campaign, advertisers need to be concerned not just by how much media is consumed, as a whole, but how many people are consuming it and how often. Thus, reach and frequency information can be important for an effective advertising campaign because it answers the questions of "How many potential customers are you talking to?" and "How often do you ask them for their business?" Further, when allocating advertising spots for a campaign, it can be important to maximize reach of the campaign while keeping frequency in a preferred range. For example, it is generally known in the advertising industry that people only "hear" or "see" the ad and take action if they are actually interested in the type of service advertised. By maximizing reach, the advertiser can maximize the number of potential customers who perceive the ad.

The conceptual diagram of FIG. 1 further shows an advertiser 130 who is interested in increasing its revenue by launching an advertising campaign 132. The advertiser 130 can define a marketing objective for the advertising campaign 132. For example, the objectives can be to increase awareness of the advertiser or the advertiser's product. Additionally, the marketing objectives can be to drive sales for a specific promotion, holiday, or event. Thus, the advertiser 130 can specify various criteria for the advertising campaign 132 in order to achieve the marketing objective.

As an example, the advertiser 130 can specify a target audience 134 for the advertising campaign 132. For example, suppose that the advertising campaign 132 is a radio advertising campaign; specifying the target audience 134 can include targeting by location, gender, age, station the audience listens to, and drive time/time of day the audience might be listening. Additionally, the advertiser 130 can interface with and communicatively couple to the advertising intermediary 120. For example, based on the demographics information of the target audience 134 for the advertising campaign 132, a target AQH can be calculated by the advertising intermediary 120 using the gross AQH number described above.

For instance, suppose that the gross AQH for an advertising spot is 10,000 listeners, which means that on average 10,000 listeners (ages 12 and above) listen to the broadcast in a 15-minute time period. Further, suppose that the target audience is only male listeners who are between the ages of 24 and 40. Based on this information and the gross AQH number, a target AQH number, can be, e.g., 2000 listeners that fit the demographics profile.

Given rate card price and a target AQH number for the spot, a target CPM for an advertising spot can be calculated as: target CPM=(rate card price/target AQH)*1000. Since the target AQH is a percentage (depending on the targeted demographic profile) of the gross AQH, the target CPM is always greater than or equal to the gross CPM for an advertising spot. For example, if the rate card price for an advertising spot is $10 and the gross AQH is 10,000 listeners, while the target AQH is 2000 listeners, then the gross CPM is $1 and the target CPM is $5 for the advertising spot.

In addition to the target audience 134, the advertiser 130 can also specify campaign caps 136 for the advertising campaign 132. Campaign caps 136 can include, e.g., number of impressions, daily budget, weekly budget, and total campaign budget. The advertiser 130 can further specify target reach and frequency 138 for the advertising campaign 104. As noted above, reach can represent the number of unique persons who perceived (e.g., heard or saw) the ad. For example, the advertiser 130 can specify a target reach of 10,000 people for an advertising campaign. Additionally, the advertiser 130 can specify a target frequency for the advertising campaign 104. As described above, frequency can represent the average number of times that a person has perceived the ad.

Furthermore, the advertiser 130 can specify target dayparts 140 for the advertising campaign 132. For example, radio advertising costs can vary greatly depend on the time of the day when the ad is aired. The radio day can be broken into different sections of so called "dayparts." Different dayparts can account for the hour ranges of the day when there is greater or smaller audience. For example, during weekdays the radio day can have five different dayparts: morning drive daypart (6 a.m. to 10 a.m.), mid day daypart (10 a.m. to 3 p.m.), evening drive daypart (3 p.m. to 7 p.m.), night time daypart (7 p.m. to 12 a.m.), and overnight daypart (12 a.m. to 6 a.m.).

Since radio audiences change significantly over the course of the day, selecting the right daypart can be essential to having a successful radio advertising campaign. Because a large percentage (approximately 75%) of the American population listens to the radio, as opposed to other media devices, when driving, the morning drive daypart has the biggest radio audience. Therefore, two adjacent dayparts can have greatly different ad prices. For example, overnight daypart is generally the least expensive and morning drive daypart is generally the most expensive.

Figure 2:
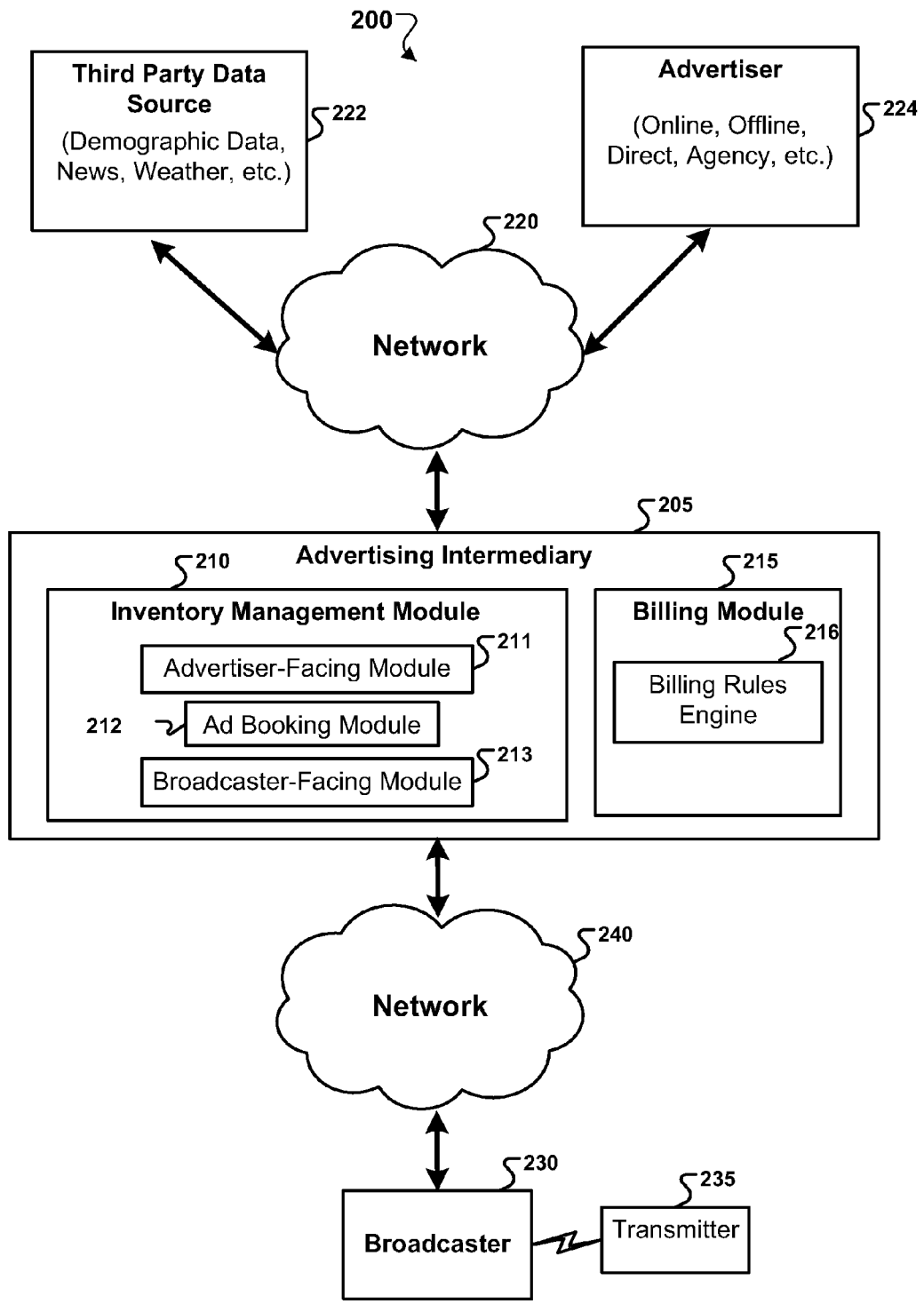
FIG. 2 is a schematic diagram of a system for booking and billing an advertising campaign.

FIG. 2 is a schematic diagram of a system 200 for booking and billing an advertising campaign. The methods, processes, engines, apparatus, computer program products, systems and the like discussed below can be applicable to audio advertising environment and other communication environments including broadcast television, cable television, satellite television, Internet communication systems (including Internet radio and Internet TV), and other communication environments.

Ads can be inventoried and categorized for system 200 in several ways, e.g., by keyword, price, vendor, last played, and the like. In some implementations, the broadcasters can use the ad inventory information and other data to schedule current ads, and reschedule new ads that may be more suitable (e.g., suitable in terms of content, price, or other criteria) in a particular time slot. For example, a broadcaster can sell a last-minute ad at a higher price (e.g., higher CPM) than other previously received ads.

As shown in FIG. 2, system 200 includes an advertising intermediary 205, which can be, e.g., Google Adwords for Audio. The advertising intermediary 205 includes an ad inventory management system (IMS) 210, which can include an advertiser-facing module 211, an ad booking module 212, and a broadcaster-facing module 213. The advertiser-facing module 211 can interface with and communicatively couple to third-party data source 222 and advertiser 224 via a network 220. In this example, the network 220 is the Internet. In other implementations, the network 220 can include any network, such as a local area network, metropolitan area network, wide area network, a wired or wireless network, a private network, or a virtual private network.

The ad booking module 212 can be used by the IMS 210 to, e.g., book an advertising campaign for the advertiser 224. Additionally, ad booking module 212 can allocate advertising spots that most closely match with the advertiser's campaign criteria (e.g., target broadcast markets and target daypart) for an advertising campaign. The broadcaster-facing module 213 can interface via network 240 with broadcaster 230, which can be, e.g., a radio station. In one implementation, network 240 can be a similar network as network 220. The broadcaster 230 can deliver broadcast content to the audience via transmitter 235.

The advertising intermediary 205 also includes a billing module 215, which can include a billing rules engine 216. As will be described in further detail below, the billing module 215 can interface with the IMS 210 to provide an end-to-end automated billing process for an advertising campaign. In addition, the billing module 215 can interface with the IMS 210 to provide automated fair billing of an advertising campaign based on campaign criteria (e.g., target daypart) specified by the advertiser. Furthermore, the billing module 215 can interface with the IMS 210 to provide automated unified billing of an advertising campaign based on the station local time concept.

The third-party data source 222 can include any database, data mart, or other data source that provides data of interest to the advertiser 224 relevant to the scheduling of advertisements. For example, third-party data can be Arbitron ratings and demographic breakdowns for each station in a broadcast network. Further, such third-party data can be of use to an advertiser 224 in deciding what amount it would be willing to pay to run an advertising campaign on a given station. In addition, third-party data can be the weather forecast, current weather conditions, or news events such as stock prices, sports scores, data from a syndicated data feed such as an RSS feed, or any other data relevant to a advertiser's desire to play an ad.

The advertiser 224 can include, e.g., online advertiser, direct sales advertiser, and advertising agency. The advertiser 224 can access the IMS 210 via a connection to the Internet 220. The connection can include, e.g., a TCP/IP protocol using a conventional dial-up connection over a modem, or a dedicated connection that provides constant access (e.g., a cable modem or a DSL connection). The IMS 210 can have a unique HTTP address, a unique FTP address, or any other addressing scheme that allows advertiser 224 to identify the IMS 210. In one implementation, advertiser 224 can have an account with the IMS 210 and be charged a fee for use of the IMS 210. In another implementation, advertiser 224 can access the IMS 210 free of charge.

Figure 3:
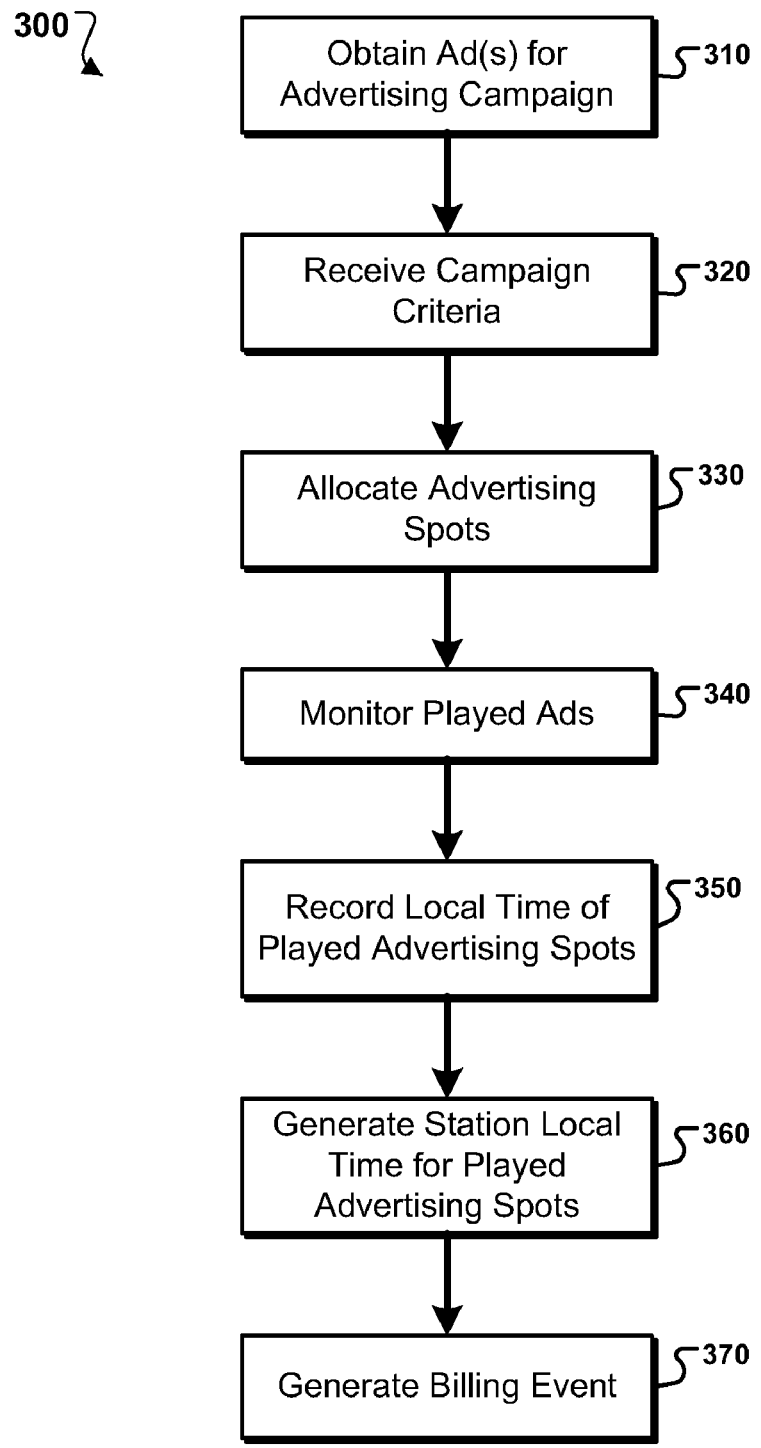
FIG. 3 is a flow chart illustrating an automated unified billing process for an advertising campaign based on the station local time concept.

FIG. 3 is a flow chart illustrating an automated unified billing process 300 for an advertising campaign based on the station local time concept. In general, the illustrated process provides unified automated billing for offline media advertising (e.g., radio, television, newspaper advertising, and the like) that spans across different time zones based on the concept of a station local time (e.g., the local time where the broadcast station is located) for the broadcast advertising spots. For example, the illustrated process involves recording the local time of played advertising spots and removing time zone information of the recorded local time to generate a station local time. Additionally, the illustrated process automatically generates a billing event based on the station local time of the played advertising spots.

In this example implementation, process 300, at 310, obtains one or more ads for an advertising campaign. As noted above, depending on the length and the objective of the advertising campaign, the advertiser may want to broadcast more than one ad during the campaign. The ads can be produced by the advertiser directly or can be produced by a radio production professional.

At 320, process 300 receives advertising campaign information/criteria from, e.g., the advertiser or a customer service representative of the advertising intermediary. As noted above, the advertiser can specify a target audience, a target daypart, target reach and frequency, a cap for number of impressions, daily budget, weekly budget, or total budget for the advertising campaign. For example, an advertiser who owns coffee shops can specify the morning drive daypart, which is between 6 a.m. to 10 a.m., as the target daypart for its advertising campaign.

Additionally, the advertising campaign criteria can include target broadcast markets to play the advertising spots. For example, for a nationwide campaign the advertiser can specify that the advertising spots be played in all major markets, including, e.g., Los Angeles, San Francisco, Chicago, and New York. As noted above, having advertising spots scheduled to be played in different markets that span many different time zones can create challenges when billing for the advertising spots. However, as will be discussed in further detail below, the unified automated billing process 300 can account for different time zones based on a station local time concept.

Process 300, at 330, allocates advertising spots to be played by broadcasters based on the specified campaign criteria. Initially, process 300 can select available broadcasters based on campaign criteria, e.g., target broadcast markets, target demographics or target dayparts. For example, suppose that the advertiser specified a target demographics of male between 25 to 55 years old for the advertising spots, the selected broadcasters can be those broadcasters that have available advertising spots with gross AQH satisfying the target demographics. Once the broadcasters with available advertising spots have been selected, process 300 can schedule the advertising spots to be played by the selected broadcasters based on, e.g., target dayparts.

After advertising spots have been allocated and scheduled for the advertising campaign, process 300, at 340, monitors ads that have been played by the broadcasters. In one implementation, an off air recorder can be used to monitor and record audio streams from the broadcasters. In one implementation, a verifier can be used to determine whether the ad was played by the selected broadcaster in a specified market. Furthermore, the verifier can search through the recorded audio stream to determine whether a scheduled ad has been played in the correct daypart.

When the ad is successfully played, at 350, process 300 records the local time of the played advertising spots. For example, suppose that an ad is scheduled to be played in an advertising spot at 6 p.m. Pacific Time. When the ad is played at 6 p.m. Pacific Time, process 300 can record the local time, which is 6 p.m. Pacific Time, of the played advertising spot. In this manner, the local time where the ad is played can be recorded, even though the advertiser or the advertising intermediary is located in a different time zone.

At 360, process 300 generates a station local time by removing the time zone information of the recorded local time associated with the played advertising spots. For example, suppose that process 300 records the local time of a played advertising spot as 6 p.m. Pacific Time. Process 300 can then remove the time zone information, i.e., "Pacific Time," from the recorded local time to generate a station local time, which is just 6 p.m. In this manner, the station local time is not associated with a particular time zone, and the station local time can be used for billing advertising spots across different time zones.

At 370, process 300 generates a billing event for the successfully played ad based on the station local time. For example, the billing event can include billing information (e.g., the station local time that the advertising spot played and the cost for the advertising spot) and billing rules (e.g., credit or payment terms) for the advertiser and the broadcaster. In this manner, process 300 can automatically generate a billing event based on each advertising spot played for an advertising campaign. Furthermore, process 300 can generate one billing event for the advertiser and a different billing event for the broadcaster for every advertising spot that successfully played.

In this manner, process 300 can provide a flexible, end-to-end billing solution for offline media, such as radio, video, television, print, and the like. For example, for each advertising spot played on the radio, after it has been confirmed successfully played on the radio station, process 300 can automatically generate a billing event that is put on the queue of the billing module (e.g., billing module 215 of FIG. 2). In addition, billing information to the advertiser can be generated, and based on the cost to the advertiser, as well as the billing rules, payment information to the radio station can also be generated. Thus, process 300 can accommodate flexible billing rules that can be changed easily to accommodate the individual contractual agreement with each station.

The process of unified billing based on the station local time can further be described using a couple of illustrative examples. In a first example, suppose that that an advertiser has chosen to run its advertising campaign during the month of January from January 1 to January 31 and has selected the night time daypart (7 p.m. to midnight) to play its advertising spots. In addition, the advertiser's local time zone is Eastern time zone, and the advertiser has selected a national campaign that covers different markets across the nation with different time zones. When an advertising spot is played on January 31 at 11 p.m. in the Pacific time zone, which is 2 a.m. on February 1 in the Eastern time zone, it can be difficult to determine whether to bill the advertiser for the played ad spot for the month of January or February.

In a second example, suppose that an advertiser has chosen to run its national advertising campaign during the month of May from May 1 to May 31 and has selected the overnight daypart (midnight to 6 a.m.) to play its advertising spots. In addition, the advertiser's local time zone is Pacific time zone and the first advertising spot is scheduled to be played at midnight on May 1. When an advertising spot is played on May 1 at 12 a.m. in the Central time zone, which is 10 p.m. on April 30 in the Pacific time zone, it can be difficult to determine whether to bill the advertiser for the played ad spot for the month of April or May.

In the first example, the unified billing process (e.g., process 300) can record the station local time as 11 p.m. on January 31, which is the local time where the broadcast station is located. In addition, because the station local time is 11 p.m. on January 31, the unified billing process can bill the advertiser for the month of January and pay the broadcast station for the month of January. In the second example, the unified billing process can record the station local time as 12 a.m. on May 1, which is the local time where the broadcast station is located. In addition, because the station local time is 12 a.m. on May 1, the unified billing process can bill the advertiser for the month of May and pay the broadcast station for the month of May.

In this manner, a station local time concept can be used to represent a sliding window time zone, where the decision on what time an advertising spot plays on can be based on the local time where the broadcast station is located. Additionally, the advertiser can be billed based on the station local time, regardless of the difference in time zone between the advertiser and the target broadcast markets. In the examples described in this disclosure, the system and techniques relate to providing unified automated billing for radio advertising campaigns. As noted above, however, the unified automated billing system and techniques described herein can also be applicable to other offline media advertising, such as newspaper advertising, television advertising, and the like.

Figure 4:
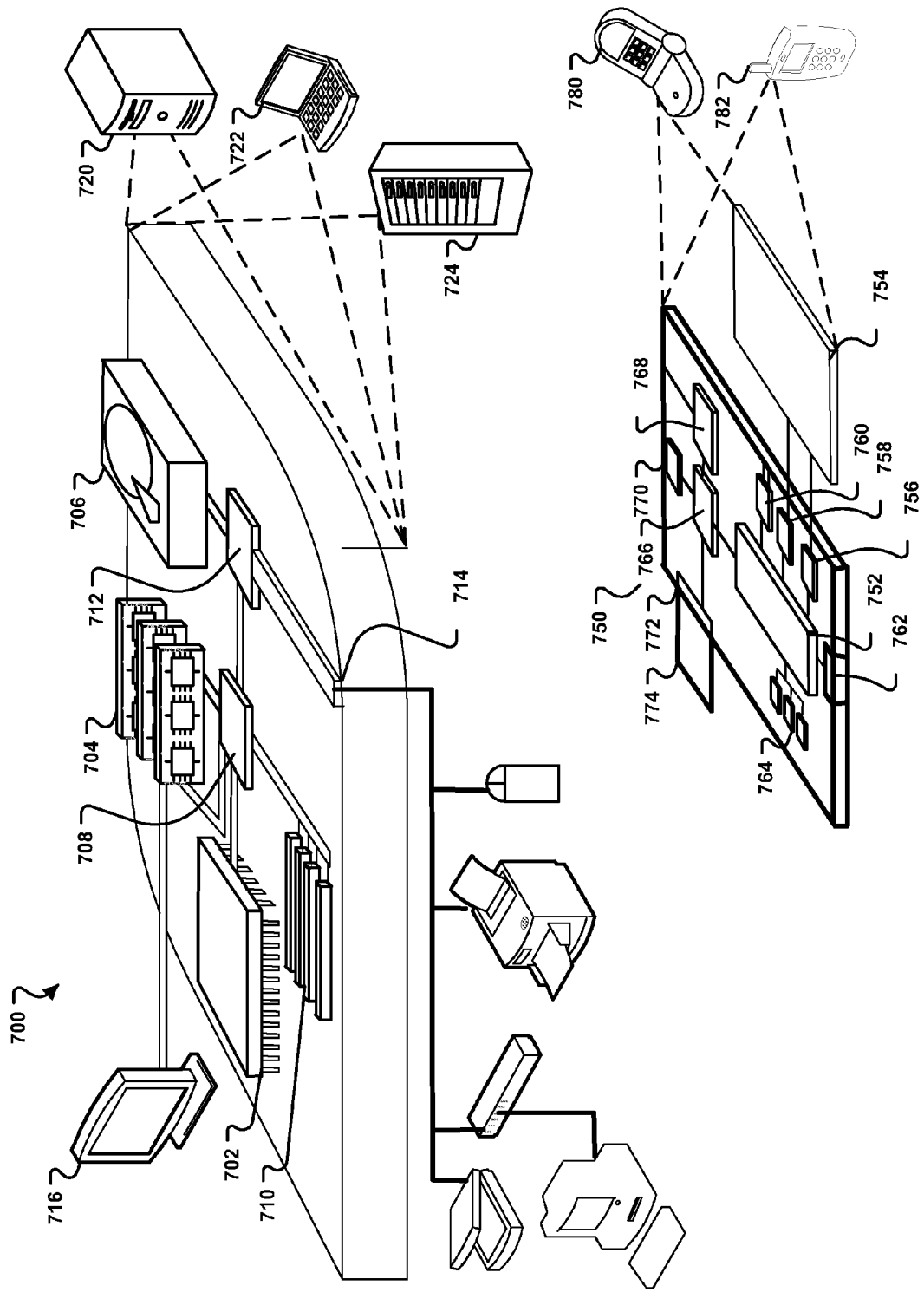
FIG. 4 is a block diagram of a computing device and system used to implement the automated billing systems describes in this disclosure.

FIG. 4 is a block diagram of a computing device and system that can be used, e.g., to implement the unified automated billing system. Computing device 700 is intended to represent various forms of digital computers, such as laptops, desktops, workstations, personal digital assistants, servers, blade servers, mainframes, and other appropriate computers. The components shown here, their connections and relationships, and their functions, are meant to be exemplary only, and are not meant to limit implementations of the inventions described and/or claimed in this document.

Computing device 700 includes a processor 702, memory 704, a storage device 706, a high-speed interface 708 connecting to memory 704 and high-speed expansion ports 710, and a low speed interface 712 connecting to low speed bus 714 and storage device 706. Each of the components 702, 704, 706, 708, 710, and 712, are interconnected using various busses, and may be mounted on a common motherboard or in other manners as appropriate. The processor 702 can process instructions for execution within the computing device 700, including instructions stored in the memory 704 or on the storage device 706 to display graphical information for a GUI on an external input/output device, such as display 716 coupled to high speed interface 708.

In other implementations, multiple processors and/or multiple buses may be used, as appropriate, along with multiple memories and types of memory. Also, multiple computing devices 700 may be connected, with each device providing portions of the necessary operations (e.g., as a server bank, a group of blade servers, or a multi-processor system). The memory 704 stores information within the computing device 700. In one implementation, the memory 704 is a computer-readable medium. In one implementation, the memory 704 is a volatile memory unit or units. In another implementation, the memory 704 is a non-volatile memory unit or units.

The storage device 706 is capable of providing mass storage for the computing device 700. In one implementation, the storage device 706 is a computer-readable medium. In various different implementations, the storage device 706 may be a floppy disk device, a hard disk device, an optical disk device, or a tape device, a flash memory or other similar solid state memory device, or an array of devices, including devices in a storage area network or other configurations. In one implementation, a computer program product is tangibly embodied in an information carrier. The computer program product contains instructions that, when executed, perform one or more methods, such as those described above. The information carrier is a computer- or machine-readable medium, such as the memory 704, the storage device 706, memory on processor 702, or a propagated signal.

The high speed controller 708 manages bandwidth-intensive operations for the computing device 700, while the low speed controller 712 manages lower bandwidth-intensive operations. Such allocation of duties is exemplary only. In one implementation, the high-speed controller 708 is coupled to memory 704, display 716 (e.g., through a graphics processor or accelerator), and to high-speed expansion ports 710, which may accept various expansion cards (not shown). In the implementation, low-speed controller 712 is coupled to storage device 706 and low-speed expansion port 714. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 700 may be implemented in a number of different forms, as shown in the figure. For example, it may be implemented as a standard server 720, or multiple times in a group of such servers. It may also be implemented as part of a rack server system 724. In addition, it may be implemented in a personal computer such as a laptop computer 722. Alternatively, components from computing device 700 may be combined with other components in a mobile device (not shown), such as device 750. Each of such devices may contain one or more of computing device 700, 750, and an entire system may be made up of multiple computing devices 700, 750 communicating with each other.

Computing device 750 includes a processor 752, memory 764, an input/output device such as a display 754, a communication interface 766, and a transceiver 768, among other components. The device 750 may also be provided with a storage device, such as a microdrive or other device, to provide additional storage. Each of the components 750, 752, 764, 754, 766, and 768, are interconnected using various buses, and several of the components may be mounted on a common motherboard or in other manners as appropriate.

The processor 752 can process instructions for execution within the computing device 750, including instructions stored in the memory 764. The processor may also include separate analog and digital processors. The processor may provide, for example, for coordination of the other components of the device 750, such as control of user interfaces, applications run by device 750, and wireless communication by device 750.

Processor 752 may communicate with a user through control interface 758 and display interface 756 coupled to a display 754. The display 754 may be, for example, a TFT LCD display or an OLED display, or other appropriate display technology. The display interface 756 may comprise appropriate circuitry for driving the display 754 to present graphical and other information to a user. The control interface 758 may receive commands from a user and convert them for submission to the processor 752. In addition, an external interface 762 may be provide in communication with processor 752, so as to enable near area communication of device 750 with other devices. External interface 762 may provide, for example, for wired communication (e.g., via a docking procedure) or for wireless communication (e.g., via Bluetooth or other such technologies).

The memory 764 stores information within the computing device 750. In one implementation, the memory 764 is a computer-readable medium. In one implementation, the memory 764 is a volatile memory unit or units. In another implementation, the memory 764 is a non-volatile memory unit or units. Expansion memory 774 may also be provided and connected to device 750 through expansion interface 772, which may include, for example, a SIMM card interface. Such expansion memory 774 may provide extra storage space for device 750, or may also store applications or other information for device 750. Specifically, expansion memory 774 may include instructions to carry out or supplement the processes described above, and may include secure information also. Thus, for example, expansion memory 774 may be provide as a security module for device 750, and may be programmed with instructions that permit secure use of device 750. In addition, secure applications may be provided via the SIMM cards, along with additional information, such as placing identifying information on the SIMM card in a non-hackable manner.

The memory may include for example, flash memory and/or MRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 764, expansion memory 774, memory on processor 752, or a propagated signal.

Device 750 may communicate wirelessly through communication interface 766, which may include digital signal processing circuitry where necessary. Communication interface 766 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 768. In addition, short-range communication may occur, such as using a Bluetooth, WiFi, or other such transceiver (not shown). In addition, GPS receiver module 770 may provide additional wireless data to device 750, which may be used as appropriate by applications running on device 750.

Device 750 may also communication audibly using audio codec 760, which may receive spoken information from a user and convert it to usable digital information. Audio codex 760 may likewise generate audible sound for a user, such as through a speaker, e.g., in a handset of device 750. Such sound may include sound from voice telephone calls, may include recorded sound (e.g., voice messages, music files, etc.) and may also include sound generated by applications operating on device 750.

The computing device 750 may be implemented in a number of different forms, as shown in the figure. For example, it may be implemented as a cellular telephone 780. It may also be implemented as part of a smartphone 782, personal digital assistant, or other similar mobile device.

Where appropriate, the systems and the functional operations described in this specification can be implemented in digital electronic circuitry, or in computer software, firmware, or hardware, including the structural means disclosed in this specification and structural equivalents thereof, or in combinations of them. The techniques can be implemented as one or more computer program products, i.e., one or more computer programs tangibly embodied in an information carrier, e.g., in a machine readable storage device or in a propagated signal, for execution by, or to control the operation of, data processing apparatus, e.g., a programmable processor, a computer, or multiple computers.

A computer program (also known as a program, software, software application, or code) can be written in any form of programming language, including compiled or interpreted languages, and it can be deployed in any form, including as a stand alone program or as a module, component, subroutine, or other unit suitable for use in a computing environment. A computer program does not necessarily correspond to a file. A program can be stored in a portion of a file that holds other programs or data, in a single file dedicated to the program in question, or in multiple coordinated files (e.g., files that store one or more modules, sub programs, or portions of code). A computer program can be deployed to be executed on one computer or on multiple computers at one site or distributed across multiple sites and interconnected by a communication network.

The processes and logic flows described in this specification can be performed by one or more programmable processors executing one or more computer programs to perform the described functions by operating on input data and generating output. The processes and logic flows can also be performed by, and apparatus can be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, the processor will receive instructions and data from a read only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. Information carriers suitable for embodying computer program instructions and data include all forms of non volatile memory, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, aspects of the described techniques can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The techniques can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

A number of embodiments have been described. Nevertheless, it will be understood that various modifications may be made without departing from the spirit and scope of the described embodiments. Accordingly, other embodiments are within the scope of the following claims.

What is claimed is:

1. A computer-implemented method comprising:
    recording, by an off air recorder device that monitors and records audio streams from broadcasters on behalf of an advertising intermediary system to determine whether an ad was actually played by a selected broadcaster in a specified market, a local time when the ad was actually played by the selected broadcaster, the local time being expressed as a time and time zone information associated with the selected broadcaster;
    generating, by a billing module associated with the advertising intermediary system, a station local time for the played ad by removing the time zone information from the recorded local time; and
    generating, by the billing module associated with the advertising intermediary system, a billing event for an advertiser located in a different time zone from the selected broadcaster, wherein the billing event specifies the station local time in which the ad was actually played by the selected broadcaster, without specifying the time zone information.

2. The method of claim 1, further comprising:
    at an inventory management module associated with the advertising intermediary system, obtaining, from the advertiser, the ad as part of an advertising campaign;
    receiving campaign criteria for the advertising campaign;
    allocating an advertising spot based on the campaign criteria; and
    monitoring, by the off air recorder device, the allocated advertising spot.

3. The method of claim 1, wherein generating the billing event includes generating billing information and payment or credit terms.

4. The method of claim 2, wherein the advertising campaign is based on offline media that includes radio advertising, television advertising, or newspaper advertising.

5. The method of claim 2, further comprising obtaining, by the inventory management module associated with the advertising intermediary system, available advertising spots from broadcasters that meet campaign criteria.

6. A computing device comprising a computer program product stored on a non-transitory computer readable medium, the stored computer program product including executable instructions causing the computing device to perform functions comprising:
    recording, on behalf of an advertising intermediary system, a local time when an ad was actually played by a selected broadcaster in a specified market, the local time being expressed as a time and time zone information associated with the selected broadcaster;
    generating a station local time for the played ad by removing the time zone information from the recorded local time; and
    generating a billing event for an advertiser located in a different time zone from the selected broadcaster, wherein the billing event specifies the station local time in which the ad was actually played by the selected broadcaster, without specifying the time zone information.

7. The stored computer program product of claim 6, further including executable instructions causing the computing device to perform functions comprising:
    obtaining the ad as part of an advertising campaign;
    receiving campaign criteria for the advertising campaign;
    allocating an advertising spot based on the campaign criteria; and
    monitoring the allocated advertising spot.

8. The stored computer program product of claim 6, wherein generating the billing event includes generating billing information and payment or credit terms.

9. The stored computer program product of claim 7, wherein the advertising campaign is based on offline media that includes radio advertising, television advertising, or newspaper advertising.

10. The stored computer program product of claim 6, further including executable instructions causing the computing device to perform functions comprising: obtaining available advertising spots from broadcasters that meet campaign criteria.

11. A system comprising:
    an off air recorder device configured to perform operations comprising:
        monitoring and recording audio streams from broadcasters to determine whether an ad was actually played by a selected broadcaster in a specified market, and
        recording a local time when the ad was actually played by the selected broadcaster, the local time being expressed as a time and time zone information associated with the selected broadcaster; and one or more processors communicatively coupled with the off air recorder device and configured to generate billing information for an advertising campaign associated with the played ad by performing operations comprising:

generating a station local time for the played ad by removing the time zone information from the recorded local time, wherein a time zone associated with the selected broadcaster is different from a billing time zone of an advertiser associated with the advertising campaign; and generating a billing event that specifies the station local time without specifying the time zone information.

12. The system of 11, wherein the one or more processors are further configured to performed operations comprising:

obtaining from an advertiser campaign criteria for the advertising campaign;

allocating the advertising spot based on the campaign criteria; and interfacing with a broadcaster that broadcasts the ad.

* * * * *